United States Patent [19]
Barton et al.

[11] 3,917,688

[45] Nov. 4, 1975

[54] PROCESS FOR THE PREPARATION OF N-MONOFLUORO-ACID AMIDES, N-MONOFLUORO AND N,N-DIFLUORO-TERTIARY AMINES

[75] Inventors: Derek Harold Richard Barton, London, England; Robert Henry Hesse, Cambridge, Mass.

[73] Assignee: Research Institute for Medicine And Chemistry Inc., Cambridge, Mass.

[22] Filed: June 26, 1973

[21] Appl. No.: 373,805

[52] U.S. Cl. ...... 260/543 F; 260/468 R; 260/476 R; 260/470; 260/471 R; 260/473 R; 260/478; 260/481 R; 260/482 R; 260/484 R; 260/484 A; 260/551 P; 260/543 A; 260/556 R; 260/556 A; 260/556 AR; 260/563 R; 260/563 P; 260/568; 260/570.5 R; 260/570.5 CA; 260/574; 260/583 NH; 260/940; 260/946; 260/947; 260/950; 260/951; 260/952; 260/953; 260/954; 260/986; 260/404; 260/408

[51] Int. Cl.² ........................................ C07C 125/00

[58] Field of Search ......... 260/543 F, 557 R, 558 R, 260/583 NH, 561 R, 570.5 R

[56] References Cited
OTHER PUBLICATIONS

Banks et al., J. Chem. Soc. (C), 1966, pp. 1514–1518.
Gakauskas, et al., J. Org. Chem., 35(5) 1970 pp. 1545–1549.

*Primary Examiner*—James A. Patten
*Assistant Examiner*—Richard D. Kelly
*Attorney, Agent, or Firm*—Bacon & Thomas

[57] ABSTRACT

The preparation of a range of N-fluorinated amides and amines by treatment of an acid amide with a hypofluorite in which the fluoroxy group is bonded to an inert electron attracting group is described, suitable fluorinating agents including fluoroalkyl hypofluorites such as trifluoromethyl hypofluorite. Primary and secondary amides are converted into N-monofluoro amides, which may be cleaved hydrolytically to yield N-monofluoroamines; N-monofluoro carboxamide products may also be cleaved fluorolytically, e.g. by treatment with excess hypofluorite, to yield N,N-difluoroamines. Tertiary amides may be converted directly into N-fluorinated amines, this last conversion preferably being effected under acid conditions.

14 Claims, No Drawings

PROCESS FOR THE PREPARATION OF N-MONOFLUORO-ACID AMIDES, N-MONOFLUORO AND N,N-DIFLUORO-TERTIARY AMINES

This invention relates to a process for the preparation of N-fluorinated organic nitrogen compounds, more particularly to the preparation of N-fluoro acid amides.

The preparation of N-fluorinated organic nitrogen compounds, for example compounds containing an N-monofluoroamino or N,N-difluoroamino group, is of considerable interest in, for example, the study of biologically active systems. Thus it is known that the substitution of a fluorine atom for a hydrogen atom in certain biologically active molecules can significantly alter the activity of the compound; the activity of 9α-fluorocortisol 21-acetate, for example, exceeds that of cortisol 21-acetate about tenfold. In the field of biologically active amine derivatives there is evidence that replacement of, for example, primary amine groups by difluoroamino groups leads to compounds having improved properties as regards, inter alia, resistance to biological oxidation and other deactivation reactions.

The preparation of N-fluorinated amino compounds may, however, create a number of problems during synthesis, particularly when sensitive or complex bioactive substrates are used. Thus commonly used fluorinating agents, such as perchloryl fluoride or elemental fluorine, tend to be somewhat unselective, leading to formation of unwanted by products or to degradation of the substrate; where a desired fluorination product can be obtained by these methods carefully controlled reaction conditions will generally be necessary to minimise the extent of such side reactions. Fluorinating agents such as perchloryl fluoride or elemental fluorine also require careful handling so that their use may necessitate specially designed and possibly expensive apparatus.

Other reagents proposed for N-fluorination of amines include tetrafluorohydrazine and difluoroamine, both of which are extremely hazardous.

We have now found that a variety of acid amides can be converted directly to fluoroamides under and /or fluoroamines mild conditions and with good selectivity using certain electrophilic fluorinating agents, and that where fluoroamide products are obtained these may, if desired, subsequently be converted to fluoroamines by simple methods.

Thus we provide a process for the preparation of an N-monofluoro acid amide or an N-monofluoro- or N,N-difluoro tertiary amine wherein an acid amide is reacted with a hypofluorite in which the fluoroxy group is bonded to an inert electron attracting group.

The acid amide starting material may be derived from a carboxylic, sulphonic, phosphonic or phosphoric acid, and suitable starting materials thus include compounds of the general formula $$R^1 - X - NHR^2 \quad (I)$$

where $R^1$ represents an organic group, $R^2$ represents a hydrogen atom or an organic group and X is

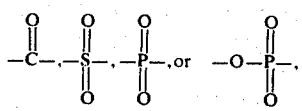

fluorination of such primary and secondary acid amides leading to formation of an N-monofluoro acid amide of general formula $$R^1 - X - NFR^2 \quad (II)$$

where $R^1$, $R^2$ and X are as defined above.

In certain instances, more particularly when $R^2$ is other than hydrogen and X represents

the product of formula II may be reacted with further fluorinating agent to induce cleavage of the amide linkage with consequent formation of an N,N-difluoroamine of general formula $$R^2NF_2 \quad (III)$$

(where $R^2$ has the above-defined meaning) or a salt thereof. We prefer to employ hypofluorites of the class defined above as fluorinating agents to induce the amide linkage cleavage in this feature of the invention.

In general, N-fluoro carboxamides of formula II are rather more reactive to fluorinating agents than corresponding carboxamide starting materials of formula I, so that further fluorination of an N-fluoro carboxamide (II) to yield an N,N-difluoroamine (III) will normally occur if excess hypofluorite reagent is used in the treatment of a carboxamide (I) or if the fluorination is unduly prolonged. If an N-monofluoro carboxamide is desired as the final product of the fluorination process, it is possible by following the course of the reaction, e.g. by n.m.r. techniques or thin layer chromatography, to halt the reaction at the point of maximum yield of the desired N-monofluoro carboxamide (II). Where, however, an N,N-difluoroamine (III) is required, the product of formula II may be reacted with further hypofluorite to yield the desired compound of formula III. According to a preferred embodiment of the invention, where such N,N-difluoroamine products are required, the carboxamide (I) is converted directly to the N,N-difluoroamine (III) by reaction with at least two equivalents of a hypofluorite, without separation of the intermediate N-monofluoro carboxamide of formula II.

Alternatively, N-fluoro acid amides of formula II may in general subsequently be subjected to hydrolytic cleavage to yield an N-monofluoro secondary amine of general formula $$R^2NHF \quad (IV)$$

(where $R^2$ has the above-defined meaning) or a salt thereof. The hydrolytic cleavage in accordance with this aspect of the invention is preferably effected using techniques similar to those described by Grakauskas, Remanick and Baum in J.A.C.S. 90, 3839 (1968) for the hydrolysis of N-fluorocarbamates, e.g. by treatment of the N-fluoro acid amide (II) with aqueous acid, for example sulphuric, perchloric or methanesulphonic acid.

Other acid amide starting materials which may be used in the process of the invention include tertiary amides, e.g. having the general formula $$R^1 - X - NR^3R^4 \quad (V)$$

wherein $R^1$ and X have the above-defined meanings and $R^3$ and $R^4$ each represent an organic group or together form a divalent organic group, fluorination of such starting materials (V) leading directly to the formation of an N-monofluoro tertiary amine of general formula $$R^3R^4NF \quad (VI)$$

(wherein $R^3$ and $R^4$ have the above-defined meansings) or a salt thereof.

The fluorination of compounds of formula V is preferably effected in the presence of an acid in order to stabilise the produce (VI) by formation of an acid addition salt. The acid is preferably a strong acid, for example a mineral acid such as hydrochloric or sulphuric acid or a strong organic acid such as p-toluene sulphonic acid. Starting materials (V) wherein X is

are preferred in this embodiment of the invention.

Hypofluorites which may be used in fluorination reactions in accordance with the invention may be represented by the formula ROF, where R is an inert electron attracting group, and include lower (e.g. $C_{1-6}$) fluoroalkyl hypofluorites, the alkyl group preferably carrying at least 2 fluorine atoms per carbon atom. Preferred reagents of this type include trifluoromethyl, perfluoropropyl, perfluoroisopropyl, perfluoro-t-butyl, monochlorohexafluoropropyl and perfluoro-t-pentyl hypofluorites, 1,2-difluoroxytetrafluoroethane and difluoroxydifluoromethane. Inorganic hypofluorites ROF wherein R represents a fluorinated covalent inorganic group may also be used, an example of such a compound being fluoroxysulphur pentafluoride. The use of trifluoromethyl hypofluorite is particularly preferred by virtue of its good selectivity and comparative ease of handling.

Where the hypofluorite is a gas or volatile liquid, it may conveniently be passed into the reaction mixture in gaseous form, if desired after mixing with a gaseous diluent such as nitrogen. Alternatively the hypofluorite may be dissolved in a solvent, advantageously a polar solvent, for example a halogenated hydrocarbon such as methylene dichloride, chloroform or chlorotrifluoromethane, a ketone such as acetone, an aliphatic ether such as diethyl ether or a cyclic ether such as tetrahydrofuan. The acid amide substrate is also preferably dissolved in a solvent, for example one or more of the solvents described for use with the hypofluorite.

The reaction temperature for the fluorination is preferably kept relatively low, for example in the range −78° to +40°C. Reaction at room temperature with fluorinating agents such as trifluoromethyl hypofluorite is rapid and smooth. If desired, the reaction may be monitored using, for example, n.m.r. spectroscopy or thin layer chromatography.

In general, the hypofluorite is preferably used in excess of the stoichiometrically required amount to ensure maximum yield of the N-fluoro acid amide. As indicated above, however, N-fluoro amides derived from carboxylic acids may react further with the fluorinating agent, with fission of the amide C—N bond so that use of a substantial excess of hypofluorite should be avoided where it is desired to isolate an N-fluoro carboxamide, and in certain such cases it may be desirable to use less than an equivalent quantity of hypofluorite.

Any ethylenic or acetylenic multiple bonds in organic groups $R^1$, $R^2$, $R^3$ and $R^4$ in starting materials of formulae I or V will tend to be fluorinated by the hypofluorite reagent unless such multiple bonds are deactivated by being substituted with or conjugated with one or more electron withdrawing groups. We therefore generally prefer that organic groups represented by $R^1$, $R^2$, $R^3$ and $R^4$ do not contain ethylenic or acetylenic bonds unless these are deactivated or unless additional fluorination is desired in a particular case. Apart from this restriction, however, a broad range of starting materials of formulae I and V may be used. Thus $R^1$, $R^2$, $R^3$ and $R^4$ may be hydrocarbyl groups, preferably selected from aliphatic, cycloaliphatic, araliphatic and aromatic groups, for example alkyl groups containing 1–30, preferably 1–20 carbon atoms, e.g. methyl, ethyl, propyl, butyl, hexyl, decyl, pentadecyl, heptadecyl, eicosyl; cycloaliphatic groups containing 3–30, preferably 5–20 carbon atoms, e.g. monocyclic or polycyclic (including bridged) cycloalkyl groups such as cyclopentyl, cyclohexyl, adamantyl and norbornyl, heteroatom-containing cyclic groups such as sugar groups, and polycyclic groups such as steroidal groups; aralkyl groups containing 1–10, preferably 1–6 carbon atoms in the alkyl chain, e.g. benzyl, phenethyl; aryl groups such as phenyl and naphthyl; and the above groups substituted by, for example, oxo, nitro, cyano, halo such as fluoro or chloro, hydroxy, esterified hydroxy e.g. lower alkylcarbonyloxy such as acetoxy or propionoxy such as benzoyloxy, sulphonyl e.g. arylsulphonyl such as benzenesulphonyl, lower alkoxy such as methoxy or ethoxy, aralkoxy such as benzyloxy, or aryloxy such as phenoxy.

The process of the invention thus permits the preparation of a wide range of organic compounds containing N-monofluoroamino or N,N-difluoroamino groups, such compounds including, for example, steroids, alkaloids, amino sugars, amino saccharides, antibiotics and surfactants. As indicated above, the ability to fluorinate amino groups present in biologically active amine derivatives is of advantage in that such fluorination may result in the improvement of properties such as resistance to biological oxidation and other deactivation reactions. Furthermore, the lipid-solubility of biologically active amines is enhanced by such fluorination, leading to greater penetration of lipid membranes on administration and, in some cases resulting in greater duration of activity.

One example of a useful N,N-difluoroamine which has been prepared in accordance with the invention is 1-difluoroaminoadamantane, which is toxic to Herpes virus.

N-fluoro acid amides obtained using the process of the invention in general comprise valuable intermediates in the synthesis of N-monofluoro and N,N-difluoro-amine derivatives such as those described above, by virtue of the facility with which such amides may be cleaved by fluorinolysis or hydrolysis as hereinbefore described to yield appropriate N-fluorinated amine derivatives. Furthermore, N-fluoro acid amid products may in certain cases also exhibit useful biological properties; thus the N-fluorosulphonamides in particular show antibacterial activity.

The process of the invention is also of value as a method of cleaving acid amide linkages to generate the corresponding free acid group. Thus where an N-fluoro acid amide of formula II is cleaved by hydrolysis or fluorinolysis as hereinbefore described, the cleavage reaction will yield, in addition to a fluorinated amine derivative, an -OR ester or acid fluoride of the acid corresponding to the acyl group $R^1X-$. The acyl fluoride is readily hydrolysable to the acid under aqueous conditions and the ester can often also be readily hydrolysed. Thus the invention provides a convenient process for the cleavage of amide linkages under mild conditions wherein the amide to be cleaved is reacted with a hypofluorite as herein defined to yield a fluoramine and the parent acid or a readily hydrolysed derivative thereof.

The following non-limitative examples serve to illustrate the invention. Unless otherwise stated temperatures are in °C and yields are corrected for recovered amide starting material.

EXAMPLE 1

N-Fluoro-N-methyl-p-fluorobenzenesulphonamide a. Fluorination using $CF_3OF$

Trifluoromethyl hypofluorite gas (ca. 1.3 mmoles) diluted with an approximately equal volume of nitrogen was bubbled through a solution of N-methyl-p-fluorobenzenesulphonamide (100 mg., 0.53 mmole) in methylene chloride (5 c.c.) and trichlorofluoromethane (20 c.c.) at 0°C. The gas outlet was connected to a trap containing aqueous potassium iodide, which reacted with excess trifluoromethyl hypofluorite to liberate iodine. Titration of the liberated iodine with sodium thiosulphate indicated that ca. 0.5 mmoles of trifluoromethyl hypofluorite were consumed during the reaction. Preparative layer chromatography of the reaction product (silica gel GF 254) gave the title compound (92 mg., 90% yield) which was recrystallised from n-hexane. The thus obtained product had m.p. 40.5° – 41°; $^1H$ n.m.r. signals ($CCL_4$) at $\delta$ 3.2 (3H, d, J = 32 Hz, $-NFCH_3$), $\delta$ 7.1 (2H, m, aromatic protons) and $\delta$ 8.0 (2H, m, aromatic protons; $^{19}F$ n.m.r. signals ($CDCl_3$) at $\phi*$ +37.6 (1 F, q, J = Hz, $-NFCH_3$) and $\phi*$ + 101.2 (1F, aromatic fluorine). (Found : C 40.72; H 3.30; N 6.81; F 18.42; S 15.54. $C_7H_7NF_2O_2S$ requires C 40.58; H 3.41; N 6.76; F 18.34; S 15.46%).

b. Fluorination using $SF_5OF$

The method of Example 1(a) was used except that fluoroxysulphur pentafluoride (ca. 0.55 mmoles) was added in place of trifluoromethyl hypofluorite. Work up gave the title compound (84% yield) identical with the product of Example 1 (a).

c. Fluorination using $CF_2(OF)_2$

The method of Example 1 (a) was used except that difluoroxydifluoromethane (ca. 0.3 mmoles, i.e. 0.6 milliequivalents) was added in place of trifluoromethyl hypofluorite. Work up gave the title compund (85% yield) identical with the product of Example 1 (a).

EXAMPLE 2

N-Fluoro-N-(2-endo-nornornyl)-p-fluorobenzenesulphonamide a. Fluorination using $CF_3OF$ N-(2-Endo-nornornyl)-p-fluorobenzenesulphoramide (100 mg., 0.37 mmole) was reacted with excess trifluoromethyl hypofluorite (ca. 1.0 mmole) in a similar manner to that described in Example 1 (a). Preparative layer chromatography of the reaction product (silica gel GF 254) afforded the title compound (uncorrected yield 71%). A sample recrystallised from a mixture of chloroform and n-hexane had m.p. 96°–97°; $^1H$ n.m.r. signals ($CCl_4$) at $\delta$ 1.3 – 2.5 (10H, nornornyl protons), $\delta$ 3.4 (1H, vb, $\gtrsim$CHNF), $\delta$ 7.3 (2H, m, aromatic protons) and $\delta$ 7.9 (2H, m, aromatic protons); $^{19}F$ n.m.r. signals ($CDCl_3$) at $\phi*$ + 36.9 (1F, broad double doublet, J = 15.8 and 5.6 Hz, $-SO_2NF$) and $\phi*$ + 101.6 (1F, m, aromatic fluorine). (Found: C 54.32; H 5.11; N 4.86; F 13.49; S 11.28. $C_{13}H_{15}NF_2O_2S$ requires C 54.34; H 5.26; N 4.88; F 13.23; S 11.16%).

b. Fluorination using $SF_5OF$

The method of Example 2 (a) was repeated except that fluoroxysulfur pentafluoride (ca. 0.4 mmole) was added in place of trifluoromethyl hypofluorite. Work up gave the title compound (80% yield) identical with the product of Example 2 (a).

EXAMPLE 3

N-Fluoro-p-fluorobenzenesulphonamide

A solution of trifluoromethyl hypofluorite in trichlorofluoramethane was prepared by bubbling the hypofluorite through the solvent at −78°. 45 c.c. of the resulting solution, containing 2 mmoles of hypofluorite, were mixed with p-fluorobenzenesulphonamide (175 mg., 1 mmole) in acetone (10 c.c.) at −78° in a pressure bottle and the system was allowed to warm to 0°C. After 15 hours the pressure was released and the system flushed with nitrogen. Evaporation of the solvent under reduced pressure gave a dark oil from which the title compound (20 mg., uncorrected yield 10.5%) was separated by preparative layer chromatography (Chrom AR Sheet 1000). The process was repeated twice using 2 mmoles of p-fluorobenzenesulphonamide and the resulting chromatographed fractions of the title compound were combined and recrystallized from carbon tetrachloride. The resulting product had m.p. 63°–65°; $^1H$ n.m.r. signals at $\delta$ 7.3 (2H, m, aromatic protons), $\delta$ 8.1 (2H, m, aromatic protons) and $\delta$ 8.9 (1H, d, J = 52 Hz, $-NHF$); $^{19}F$ n.m.r. signals at $\phi$ + 91.2 (1F, d, J = 52 Hz, $-NHF$) and $\phi$ + 110.8 (1F, m, aromatic fluorine). (Found: C 37.61; H 2.66; N 7.03; F 19.88; S 16.34. $C_6H_5NF_2O_2S$ requires C 37.32; H 2.61; N 7.25; F 19.67; S 16.60%).

EXAMPLE 4

N-Fluoro-N-methylstearamide

Trifluoromethyl hypofluorite gas (ca. 4 mmoles) diluted with an approximately equal volume of nitrogen was bubbled through a solution of N-methylstearamide (1 g., 3.4 mmold1s) in chloroform (25 c.c.) at room temperature. The resulting chloroform solution was washed with ice cold aqueous saturated sodium bicarbonate solution (50 c.c.) and ice cold water (2 x 50 c.c.) and dried over magnesium sulphate. Evaporation of the solvent under reduced pressure gave an oily residue which was chromatographed on a silica gel column using benzene as eluant. The first fraction to be eluted comprised stearoyl fluoride and trifluoromethyl stearate, the second fraction comprising the title compound (81% yield). A sample of the title compound recrystallised twice from n-hexane had m.p. 53°–54°, $^1H$ n.m.r. signals ($CDCl_3$) at $\delta$ 0.9 – 1.3 (33H), $\delta$ 2.5 (2H) and $\delta$ 3.5 (3H, d, J = 27 Hz, $-NFCH_3$); $^{19}F$ n.m.r. signal ($CDCl_3$) at $\phi$ + 56.4 (tq, $J_{H1F}$ = 27 Hz and $J_{H2F}$ H1F = 4.5 Hz, $-CH_2^2$—$CONFCH_3^1$). (Found C 72.35; H 11.95; N 4.50; F 6.15. $C_{19}H_{38}NFO$ requires C 72.33; H 12.14; N 4.40; F 6.02%).

EXAMPLE 5

N-Fluoro-N-methyl-p-fluorobenzamide

Fluoroxysulphur pentafluoride gas (ca. 16 mmoles) diluted with an approximately equal volume of nitrogen gas was bubbled through a solution of N-methyl-p-fluorobenzamide (2.5 g., 16 mmoles) in chloroform (25 c.c.) at room temperature. The resulting chloroform solution was washed with ice cold aqueous saturated sodium bicarbonate solution (50 c.c.) and ice cold water (2 × 50 c.c.) and dried over magnesium sulphate. The solvent was evaporated under reduced pressure and the residue chromatographed on a silica gel column using n-hexane as eluant. The first fraction to be eluted comprised trifluoromethyl p-fluorobenzoate and the second fraction comprised trifluoromethyl p-fluorobenzoate and p-fluorobenzoyl fluoride. A third fraction comprising the title compound (41% yield) was eluted with a 1:1 mixture of n-hexane and methylene dichloride. Further elution with methylene chloride gave unreacted starting material.

A sample of the thus obtained title compound was distilled at 0.5 mm Hg pressure and 70°–80°C. The distillate showed $^1$H n.m.r. signals (CDCl$_3$) at δ 3.5 (3H, d, J = 27.5 Hz, —NFCH$_3$), δ 7.1 (2H, m, aromatic protons) and δ 7.8 (2H, m, aromatic protons); $^{19}$F n.m.r. signals (CCl$_4$) at φ + 46.4 (1F., q, J = 27.5 Hz, —CONFCH$_3$) and φ + 106.1 (1F, m, aromatic fluorine). (Found C 55.83; H 3.98; N 7.98; F 22.52. C$_8$H$_7$F$_2$NO requires C 56.14; H 4.12; N 8.18; F 22.20%).

EXAMPLE 6

Fluorination of N-Adamant-1-ylacetamide

Trifluoromethyl hypofluorite gas (ca. 60 mmoles) diluted with an approximately equal volume of nitrogen was bubbled through a solution of N-adamante-1-ylacetamide (5 g., 26 mmoles) in chloroform (30 c.c.) at room temperature. Distilled water (ca. 20 c.c.) was added during the course of the reaction to dissolve solid material which precipitated. The chloroform layer was separated and the aqueous layer was extracted with chloroform (2 × 50 c.c.). The chloroform extracts were combined, dried over magnesium sulphate, and the solvent was evaporated to give an oil. The oil was triturated with n-hexane to precipitate unreacted starting material, which was filtered off. The filtrate was chromatographed on an alumina column (230 g., grade 3), elution with n-hexane giving 1-difluoroaminoadamantane (2.91 g., 75% yield). After sublimation at 100° and 20 mm. Hg pressure the product had m.p. 113°–115° (sealed tube); $^1$H n.m.r. signals (CDCl$_3$) at φ − 20.3 (bs, —NF$_2$). (Found C 64.39; H 7.94; N 7.38; F 20.3. C$_{10}$H$_{15}$NF$_2$ requires C 64.15; H 8.08; N 7.48; F 20.29%).

Further elution of the chromatography column with benzene gave N-adamante-1-yl-N-fluoroacetamide (190 mg., uncorrected yield 4%), which was liquid at room temperature. A sample distilled at 80° – 90° and 0.5 mm. HG pressure had $^1$H n.m.r. signals (CCl$_4$) at δ 1.75 (bs, adamantyl protons), δ 1.95 (half of doublet, other half masked by δ 2.15 signal), and δ 2.15 (b, adamantyl protons); $^{19}$F n.m.r. signals at φ + 81.3 (q, J = 9.8 Hz, CH$_3$CONFR). (Found: C 68.43; H 8.66; N 6.80; F 8.84. C$_{12}$H$_{18}$FNO requires C 68.23; H 8.59; N 6.63; F 9.00%).

Fluorination of a chloroform solution of an N-adamant-1-yl-N-fluoroacetamide with trifluoromethyl hypofluorite gave further 1-difluoroaminoadamantane in 83% yield.

The yield of N-adamant-1-yl-N-fluoroacetamide can be increased by reducing the quantity of fluorinating agent used, so lessening the extent of subsequent reaction by the hypofluorite and N-fluoro amide to form 1-difluoroaminoadamantane. Thus when the reaction was repeated using ca. 7 mmoles of trifluoromethyl hypofluorite, the N-fluoroacetamide was obtained in 35% corrected yield.

We claim:
1. A process for the preparation of a compound selected from the group consisting of N - monofluoroacid amides, N - monofluoro - and N, N-difluoro - tertiary amines which comprises reacting in polar organic solvent an acid amide of the formula

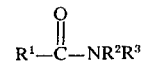

wherein R$^1$ represents a C$_{1-30}$ alkyl group, a C$_{3-30}$ cycloaliphatic group, an aralkyl group containing 1 – 10 carbon atoms in the alkyl chain or an aryl group or any of these groups substituted by at least one of oxo, nitro, cyano, halo, hydroxy, esterified hydroxy, sulphonyl, lower alkoxy, aralkoxy, or aryloxy; R$^2$ and R$^3$ are the same as R$^1$ or hydrogen or are taken together to form a divalent organic radical, with a hypofluorite having the formula ROF, where R represents a lower fluoroalkyl group containing at least two fluorine atoms per carbon atom or a fluorinated covalent inorganic group.

2. The process of claim 1 where R$^3$ is hydrogen and R$^2$ is other than hydrogen, to yield an n- monofluoroacid amide of the formula

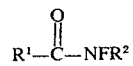

3. A process as claimed in claim 2 wherein the N-monofluoro acid amide product is fluorinated further to yield an N,N-difluoroamine of formula
R$^2$NF$_2$ (III)

4. A process as claimed in claim 2 wherein the N-monofluoro acid amide is subjected to hydrolytic cleavage to yield an N-monofluoroamine of formula
R$^2$NHF (IV)

5. The process of claim 2 wherein the acid amide material is N - adamant -1 - ylacetamide to yield N - adamant - 1 - yl - N - fluoroacetamide.

6. The process of claim 1, wherein the starting acid amide is a tertiary amide and a N - monofluoroamine of the formula
R$^2$R$^3$NF,
wherein R$^2$ and R$^3$ are other than hydrogen, or a salt thereof is formed.

7. A process as claimed in claim 6 wherein the reaction is effected in the presence of an acid selected from the group consisting of mineral acids and strong organic acids.

8. A process as claimed in claim 1 wherein the acid amide is reacted with at least two equivalents of the hypofluorite to yield directly an N,N - difluoroamine without separation of the intermediate N - monofluoro carboxamide.

9. A process as claimed in claim 1 wherein the hypofluorite is trifluoromethyl hypofluorite.

10. A process as claimed in claim 1 wherein R$^1$, R$^2$ and R$^3$ are each methyl, ethyl, propyl, butyl, hexyl, decyl, pentadecyl, heptadecyl, eicosyl, cyclopentyl, cyclohexyl, adamantyl, norbornyl, benzyl, phenethyl, phenyl, naphthyl, or any of the above groups substituted by oxo, nitro, cyano, halo, hydroxy, esterified hydroxy, sulphonyl, lower alkoxy, aralkoxy or aryloxy.

11. The process of claim 1, wherein the reaction temperature for the fluorination is from −78° to + 40°C.

12. The process of claim 1, wherein the hypofluorite is selected from the group consisting trifluoromethyl, perfluoropropyl, perfluoroisopropyl, perfluoro - t - butyl, monochlorohexafluoropropyl and perfluror-t-pentyl hypofluorites, 1, 2 - difluoroxytetrafluoroethane, difluoroxydifluoromethane, and fluoroxysulphur pentafluoride.

13. A process for the preparation of an N - monofluoro-carboxylic acid amide, comprising monofluorinating a secondary carboxylic acid amide by reaction with a hypoflurite having the formula ROF where R represents a lower fluoralky group containing at least two fluorine atoms per carbon atom or a fluorinated covalent inorganic group.

14. A process for the preparation of an N - monofluoro - tertiary amine, comprising monofluorinating an acid tertiary carboxamide by reaction with a hypofluorite having the formula ROF where R represents a lower fluoroalkyl group containing at least two fluorine atoms per carbon atom or a fluorinated covalent inorganic group.

* * * * *

UNITED STATES PATENT OFFICE
CERTIFICATE OF CORRECTION

Patent No. 3,917,688           Dated November 4, 1975

Inventor(s) BARTON, Derek Harold Richard & HESSE, Robert Henry

It is certified that error appears in the above-identified patent and that said Letters Patent are hereby corrected as shown below:

Page 1, please insert

--[30] Foreign Application Priority Data
      June 27, 1972   Great Britain     30129/72--.

Signed and Sealed this

Third Day of August 1976

[SEAL]

Attest:

RUTH C. MASON
*Attesting Officer*

C. MARSHALL DANN
*Commissioner of Patents and Trademarks*